June 4, 1968 J. J. MUNNELLY 3,387,203
FREQUENCY CHANGER
Filed Jan. 7, 1965
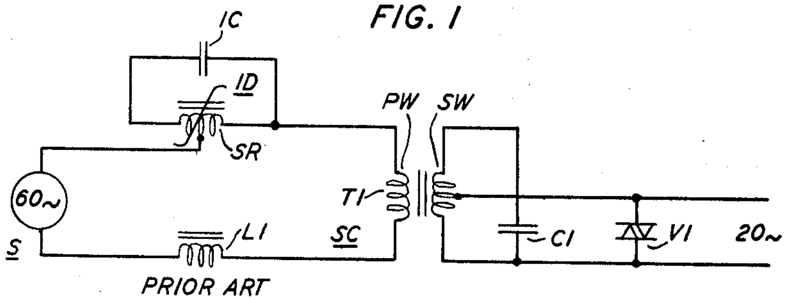
PRIOR ART
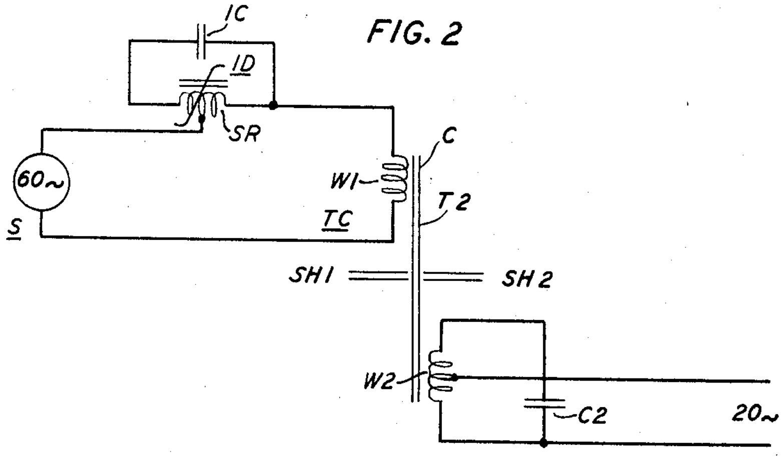
T2 FIG. 3
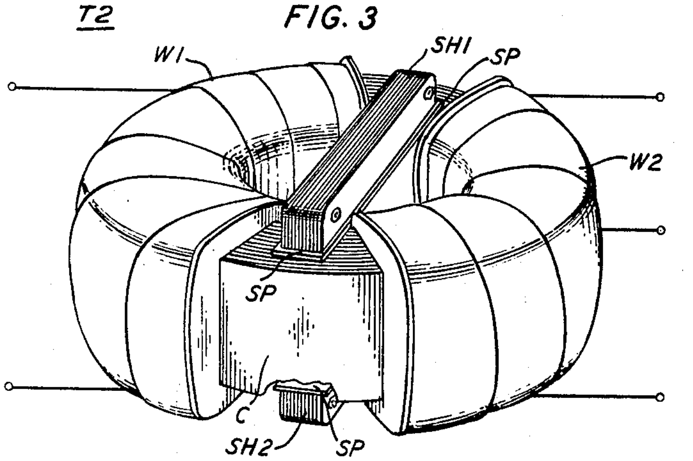
INVENTOR
J. J. MUNNELLY
BY Leo Stanger
ATTORNEY 3,387,203
Patented June 4, 1968

3,387,203
FREQUENCY CHANGER

James J. Munnelly, Parsippany-Troy Hills Township, Morris County, N.J., assignor to Bell Telephone Laboratories, Incorporated, New York, N.Y., a corporation of New York Filed Jan. 7, 1965, Ser. No. 424,091
12 Claims. (Cl. 321—68)

ABSTRACT OF THE DISCLOSURE

In a subharmonic generator a 60-cycle source energizes an idler circuit tuned to 100 cycles and including a saturable reactor for generating harmonics of both frequencies and modulation sums and differences of all frequencies. A tuning circuit in series with the idler circuit is tuned to a modulation frequency of twice 60 cycles less 100 cycles, or 20 cycles. It comprises a transformer whose secondary is shunted by a tuning capacitor and whose flux from the primary winding is shunted by means of a magnetic shunt short-circuiting the transformer core. The core is unsaturable. Gaps between the core and shunt produce fringing that causes stabilizing eddy currents in the core.

This invention relates to frequency changers, and particularly to self-starting subharmonic frequency generators whose output voltages oscillate at frequencies lower than the applied input voltage, and which often serve for ringing telephones.

Self-starting subharmonic frequency generators are described in detail in the J. M. Manley Patent 2,272,246. In such generators a source of one frequency $f_s$ feeds energy to two tuned circuits effectively resonating at two other frequencies $f_1$ and $f_2$. An unlinear self-saturating reactor common to both tuned circuits generates from the three fundamental frequencies harmonics whose mixture with the fundamentals produces numerous beat frequencies. For operation, each tuned circuit tunes to a prominent beat frequency equal to twice the source frequency less the frequency with which the other tuned circuit resonates. Thus, there exist the two interrelated relations $f_1=2f_s-f_2$ and $f_2=2f_s-f_1$. In this way, each tuned circuit modulates the source energy to generate a beat frequency that equals the frequency of the other tuned circuit and is of such phase as to regeneratively build up and sustain oscillations in the other tuned circuit. The oscillations in one tuned circuit are used as output energy. The other oscillating tuned circuit generally remains idle.

In a practical case, the output circuit is a series resonant circuit, the input frequency is 60 cycles, the idler frequency 100 cycles, and the output frequency 20 cycles. In a practical circuit, rather than taking the output directly across either the inductor or capacitor of the series resonant circuit, a transformer whose primary winding connects in series with the inductor and whose secondary winding has the capacitor connected thereacross constitutes the output circuit. The transformer merely reflects the capacitance at its output in series with the inductance. Preferably, the output is taken across only a suitable portion of the secondary winding. By giving it a proper turns ratio, the transformer increases the apparent capacitance of the series resonant capacitor. This limits the weight and size of the capacitor necessary for operation.

Such subharmonic generators, aside from exhibiting great bulk due to the iron and windings necessary for both the transformer and the inductor, have outputs that may shift, in response to input transients, to unwanted high voltage modes which exaggerate undesirable frequency components. This may be explained in part by the transient's causing saturation of the transformer iron and effectively distorting the reflected capacitance. Moreover, even with steady state inputs the 20-cycle output voltage tends to exhibit a low frequency modulation. To prevent both of these effects and stabilize the output voltage it is customary to connect a nonlinear varistor type load across the output leads.

An object of this invention is to improve such subharmonic generators, particularly by reducing the amount of weight and bulk necessary for producing any particular amount of output power.

Another object of the invention is to increase the efficiency of such Manley type ringing generators.

Still another object of the invention is to eliminate the need for voltage regulators at the output of the generators.

According to the invention, these ends are achieved by eliminating altogether the separate inductance of the series resonant circuit serially connected to the saturable reactor, and connecting a shunt member across the iron of the transformer where it emerges from the ends of the primary windings. The magnetic shunt imparts to the transformer primary winding an inductance sufficiently high to tune with the capacitor of the series resonant winding and thereby eliminate the need for the extra core.

According to another feature of the invention, additional output voltage stability is achieved by placing gaps intermediate the core and the shunt member. Such gaps produce fringing of flux lines that impinge upon the main iron core in directions inducing losses proportional to the input. This corresponds to a negative feedback that stabilizes the output voltage.

Other features of the invention, both broader and more specific, are pointed out in the claims forming a part of this specification. Other objects and advantages will become obvious from the following detailed description when read in light of the accompanying drawing, wherein:

FIG. 1 is a schematic circuit diagram of a subharmonic frequency generator according to the prior art;

FIG. 2 is a schematic circuit diagram of a subharmonic frequency generator embodying features of the invention; and FIG. 3 is a perspective view and partially schematic diagram of the transformer in the frequency generator of FIG. 2.

In the prior art subharmonic frequency generator of FIG. 1, a 60-cycle source S energizes an idler circuit ID in series with a series resonant circuit SC. The turning of the circuits ID and SC are such as to cause them to resonate at 100 cycles per second and 20 cycles per second, respectively. The circuit ID comprises an idler capacitor IC across a saturating reactor SR whose autotransformer connection merely serves to increase the effective value of the capacitance IC. The circuit SC comprises an impedance reflecting transformer T1, an inductor L1 in series with the primary winding PW of the transformer, and a capacitor C1 across the transformer secondary winding SW whose value is reflected across the primary winding PW. Because of the connections the reactor SR can be said to be common to both circuits SC and ID.

It can be demonstrated and has been shown in the Manley patent cited above that in such a circuit the source S starts oscillations of 100 cycles in the idler circuit and 20 cycles in the circuit SC. The unlinear characteristic of the saturating reactor SR generates from these three fundamental frequencies harmonics of all, as well as beat frequencies of these fundamentals and harmonics. The circuit ID is tuned to the beat frequency 2(60)−20 or 100 cycles per second, and the circuit SC is tuned to 2(60)−100 or 20 cycles per second.

The effective value of capacitor C1 is increased by making the ratio of SW to PW relatively high. A loading varistor V1 across the output lines stabilizes the output voltage by suppressing undesirable fluctuations in the voltage output and eliminating modes that may result from input voltage transients.

Generally, 100-cycle oscillations in the idler circuit ID and the 20-cycle oscillations in circuit SC are sustained because each resonant circuit causes beat frequencies at a phase that regeneratively feeds energy to the other, thereby building up its oscillations. Further information on this process may be had from the Manley patent cited above, or an article entitled "Negative Resistance Effects in Saturable Reactor Circuits" by J. M. Manley and E. Peterson in the American Institute of Electrical Engineers Transactions, December 1946, volume 65, pages 870 to 881.

Subharmonic frequency generators such as shown in FIG. 1 are quite reliable but bulky and costly. An improved frequency generator according to the invention is shown in FIG. 2 where parts corresponding to those of FIG. 1 are designated with like reference characters. In FIG. 2, a 60-cycle source S energizes a saturating reactor SR and an idler capacitor IC that form an idler circuit ID resonating at 100 cycles. However, instead of the circuit SC, FIG. 2 has a transformer circuit TC comprising a transformer T2 and a capacitor C2 similar to C1. The reactor SR may again be considered common to both circuits ID and TC. The transformer T2 appears more clearly in FIG. 3.

In FIG. 3 a primary winding W1 corresponding to the winding PW of FIG. 1 surrounds a toroidal core C over a portion of the core periphery. The core C also supports a secondary winding W2, corresponding to the winding SW in FIG. 1, over another portion of the core arcuately spaced from the first portion. A magnetic shunt SH1 connects the top surface of the open portions of the core C. Spacing the ends of the shunt SH1 from the opposite open surface of the core C is a nonferrous spacer SP. A shunt SH2 identical to the shunt SH1 connects the bare portions of the opposite peripheral faces on the bottom of the core C. A similar spacer SP forms high reluctance gaps in the shunts. Binder means not shown secure the shunts SH1 and SH2 and spacers SP to the core.

In FIG. 2, the capacitor C2 is also shown with the winding W1, W2 and shunts SH1 and SH2. The capacitor C2 corresponding to the capacitor C1 of FIG. 1 connects across the winding W2. A voltage of 20-cycle appears across the secondary winding W2 which is tapped at an appropriate point for output.

In operation, the idler circuit ID composed of members IC and SR modifies the current from the 60-cycle source before passing it to the primary winding W1. The current through the winding W1 circulates flux through the core C. The shunts SH1 and SH2 direct some of the flux passing through the core C from inside the coil of winding W1 and out to the exposed core portions, right back through the core portion embraced by the winding W1, thereby preventing some of these flux lines from linking winding W2. The flux circulating through the core portion under winding W1 and the shunts SH1 and SH2 imparts a high reactance to the winding W1 similar to the reactance of the inductor L1. The capacitance C2 now reflected into the primary winding W1 by the transformer T2 tunes the transformer circuit TC so that it resonates at 20 cycles.

The saturating reactor SR, because of its unlinear characteristics, produces manifold harmonics of the 60-cycle input frequency, the 20-cycle resonant circuit frequency, and the 100-cycle idler frequency, and produces beat frequencies that arise therefrom. The phases of the 100- and 20-cycle beat frequencies are such as to build up and sustain the oscillations established in the idler circuit IC and the transformer circuit TC. It thus produces a voltage across winding W2 having the frequency of 20 cycles. A suitable part of this voltage is used for the output.

The output of the generator in FIG. 2 is substantially free of low frequency modulation and unwanted modes, even in the presence of high transient input voltages and despite the absence of a loading varistor such as V1 across the output lines. The desirable stabilizing effect previously accomplished by the varistor V1 is performed in part by the gaps made by the spacers SP. These gaps allow fringing of the flux threading through the shunts SH1 and SH2. Many fringing flux lines impinge on the core C at angles inducing lossy eddy currents in the core. These help stabilize the output voltage. Moreover, the fringe producing gaps are close enough to the windings W1 and W2 for the fringing flux to link the windings and induce stabilizing voltages therein.

Additional stabilizing effects are achieved when the material of core C is grain oriented. In that case some fringing flux lines must return through paths in the core which are not aligned with the grain orientation. This results in further stabilizing losses.

Conventional transformers are built to minimize leakage reactance and flux fringing. However, contrary to this generality, the flux fringing here is desirable.

By virtue of the circuitry in FIG. 2 and construction in FIG. 3, it was possible to construct a subharmonic frequency generator weighing approximately two thirds of a similar frequency generator corresponding to FIG. 1 and yet requiring about 22 percent less input power to produce the same power output. At least some of this decrease in power input may be attributed to reduction of core losses incident to the previous inductor L1.

A sample generator was constructed with the following details and values. These are presented for purposes of illustration and should not be taken as limiting.

In the sample generator the values of IC and C2 were each five microfarads. The core C of transformer T2 comprises a tape wound core of 3.0 inch outer diameter, 2⁵⁄₆₄ inch inner diameter, 1⅛ inches high, of .012 inch thick M6 grade grain oriented silicon steel. The winding W1 had 1130 turns of #24 H.F. wire embracing 135° of the core C. The winding W2 had 4260 turns of #30 H.F. wire, tapped at 2480 turns and covering 135° of the core C. The shunts SH1 and SH2 each comprised .420 inch stack of 2¾ inch long .316 high and .014 inch thick laminations of M–10 grain oriented steel. The spacers SP were .032 inch thick.

While an embodiment of the invention has been described in detail it will be obvious to those skilled in the art that the invention may be embodied otherwise without departing from its spirit and scope.

What is claimed is:

1. A frequency generator comprising, terminal means for connection to a voltage of given frequency, idler circuit means connected to said terminal means and tuned to a frequency different from said given frequency for establishing beat frequencies, tuned means including a transformer having a primary winding connected to said idler circuit means and including capacitor means, said transformer having a secondary winding and a core linking the primary and secondary windings, and magnetic means for keeping a portion of the flux generated by currents through the primary winding out of said secondary winding so as to increase the transformer inductance, said magnetic means including a magnetic shunt magnetically forming a separate flux path from one end of the primary winding to the other, said capacitor means and said transformer tuning said tuned means to one of said beat frequencies.

2. A frequency generator comprising, terminal means for connection to a voltage of given frequency, idler circuit means connected to said terminal means and tuned to a frequency different from said given frequency, said idler circuit means having saturable reactance means for establishing harmonics of both frequencies and establishing beat frequencies, tuned means including a transformer having a primary winding connected to said idler circuit means and including capacitor means, said transformer having a secondary winding and a core linking the primary and secondary windings, and magnetic means for confining some of the flux generated by currents through the primary winding to a portion of the core more closely linked to the primary winding than said secondary winding so as to increase the transformer inductance, said magnetic means including a magnetic shunt connecting the core portions where they emerge from the primary winding, said capacitor means and said transformer tuning said tuned means to one of said beat frequencies, said saturable reactance means also forming harmonics and other beat frequencies based on the fundamental frequency to which said tuned means are tuned, the frequency to which said idler circuit means are tuned being one of said other beat frequencies.

3. A frequency generator comprising, terminal means for connection to a voltage of given frequency, idler circuit means, tuned circuit means, said idler circuit means and said tuned circuit means being connected to each other and to said terminal means, said idler circuit means being tuned to a frequency different from said given frequency and including saturable reactance means for generating harmonics of both frequencies and establishing beat frequencies; said tuned means including a transformer having a core, a primary and a secondary winding embracing portions of the core, and capacitor means; magnetic means for confining a portion of the flux generated by the primary winding substantially to the portion of the core embraced by the primary winding so as to increase the inductance of the transformer, said magnetic means including a magnetic shunt connecting the core portions where they emerge from the primary winding, said windings each having a plurality of turns, said capacitor means and said transformer tuning said tuned means to one of said beat frequencies, said capacitor means being connected across one of said windings, said one of said windings being otherwise connected by a number of said turns less than the number across which said capacitor means are connected, said saturable reactance means also forming part of said tuned means and establishing harmonics and other beat frequencies to which said tuned means are tuned, the frequency to which said idler circuit means are tuned being one of said other beat frequencies.

4. A frequency generator comprising, terminal means for connection to a voltage of given frequency, idler circuit means connected to said terminal means and tuned to a frequency different from said given frequency, said idler circuit means including saturable reactance means for generating harmonic frequencies of both frequencies and generating beat frequencies, tuned means including a transformer connected to said idler circuit means, said transformer having a core and primary and secondary windings embracing respective portions of the core, magnetic means for keeping some of the flux generated by the primary winding from linking the secondary winding so as to increase the inductance of the transformer, said magnetic means including a magnetic shunt connecting the core portions where they emerge from the primary winding, said magnetic means including means for forming a gap between said shunt and said core for producing fringing of flux, and capacitor means in said tuned means for tuning the tuned means to one of said beat frequencies, said saturable reactance means also forming part of said tuned means and establishing harmonics and other beat frequencies to which said tuned means are tuned, the frequency to which said idler circuit means are tuned being one of said other beat frequencies.

5. A frequency generator comprising, terminal means for connection to a voltage of a first fundamental frequency, idler circuit means and tuned circuit means connected to said terminal means and tuned to respective second and third fundamental frequencies, unlinear means common to both of said circuit means for establishing harmonics and beat frequencies, said tuned means including a transformer having a primary winding connected to said idler circuit means and including capacitor means, said transformer having a secondary winding and a core linking the primary and secondary windings, and magnetic means for keeping a portion of the flux generated by currents through the primary winding out of said secondary winding so as to increase the transformer inductance, said magnetic means including a mangetic shunt magnetically forming a separate flux path from one end of the primary winding to the other, said capacitor means and said transformer tuning said tuned means to one of said beat frequencies for which said idler circuit means are responsible, the fundamental frequency to which said idler circuit means are tuned being a beat frequency which said tuned circuit contributes, said magnetic means including means for forming a gap between said shunt and said core for producing fringing of flux.

6. A frequency generator for connection to a source of one frequency comprising, nonlinear idler circuit means responding to said source and tuned to another frequency for generating harmonics of the frequency to which it is tuned and the source frequency and for establishing beat frequencies, a resonant circuit tuned to one of said beat frequencies and connected to said idler circuit, said resonant circuit including a core closed upon itself and having two windings embracing separate portions along the core, said core having a substantially uniform cross section throughout its shape, magnetic means for restricting the flow of some of the flux generated by one of said windings to a path that avoids the other winding so as to increase the inductance represented by said windings, said magnetic means including a shunt magnetically connecting parts of the core between the portions which the windings embrace, and capacitor means in said resonant circuit for tuning the resonant circuit.

7. A frequency generator for connection to a source of one frequency comprising, nonlinear idler circuit means responding to said source and tuned to another frequency for generating harmonics of both frequencies and for establishing beat frequencies, a resonant circuit tuned to one of said beat frequencies and connected to said idler circuit, said resonant circuit including a core closed upon itself and having two windings embracing separate portions along the core, said core having a substantially uniform cross section throughout its shape, magnetic means for restricting the flow of some of the flux generated by one of said windings to a path that avoids the other winding so as to increase the inductance represented by said windings, said mangetic means including a shunt magnetically connecting parts of the core between the portions which the windings embrace, capacitor means in said resonant circuit for tuning the resonant circuit, output leads from said resonant circuit, and voltage control means in said magnetic means for regulating the voltage at said output leads and including spacers forming a gap in the flux path of said shunt for producing flux fringing so that flux lines from the path of said shunt impinge on said core, said idler circuit means being so connected to said resonant circuit as to generate harmonics of the frequency to which said resonant circuit is tuned and to establish other beat frequencies, said idler circuit means being tuned to said other beat frequencies, said voltage control means being the sole means for regulating the output voltage at said leads.

8. A frequency generator comprising, terminal means for connection to a source of a given frequency, idler circuit means and resonant circuit means connected to said terminal means and tuned to two other frequencies, unlinear means common to both of said circuit means for establishing harmonics and beat frequencies to which said circuit means and the source contribute, said resonant circuit means including a toroidal core and having two windings embracing separate portions along the core, said core having a substantially uniform cross section throughout its shape, magnetic means for restricting the flow of some of the flux generated by one of said windings to a path that avoids the other winding so as to increase the inductance represented by said windings, said magnetic means including a shunt magnetically connecting parts of the core between the portions which the windings embrace, capacitor means in said resonant circuit means for tuning the resonant circuit means, the frequency to which said resonant circuit means are tuned being one of the beat frequencies to which said idler circuit means contribute, the frequency to which said idler circuit means are tuned being a beat frequency to which said tuned circuit means contribute, output leads from said resonant circuit means, and voltage control means for regulating the voltage at said output leads and including spacers forming a gap in the flux path of said shunt for producing flux fringing so that flux lines from the path of the shunt impinge on said core, said voltage control means being the sole means for regulating the output voltage at said leads including spacers forming a gap in the flux path of said shunt for producing flux fringing so that flux lines from the path of the shunt impinge on said core, said voltage control means being the sole means for regulating the output voltage at said leads.

9. A frequency generator comprising, nonlinear idler circuit means responding to a source of one frequency and tuned to another frequency for establishing harmonics of both frequencies and generating beat frequencies, a resonant circuit tuned to one of said beat frequencies and having a transformer with a primary winding series connecting said idler circuit to the source, a core in said transformer closing upon itself and having a portion embraced by said primary winding, said core having a substantially uniform cross section throughout its shape, a secondary winding in said transformer embracing another portion of the core, magnetic means for diverting a portion of the flux generated by said primary winding in the core away from said secondary winding and back to said primary winding so as to increase the inductance exhibited by said primary winding, said magnetic means including spare portions on the core between said primary winding and said secondary winding and including a magnetic shunt connecting said spare portions, and capacitor means connected across one of said windings for tuning said resonant circuit.

10. A frequency generator comprising, nonlinear idler circuit means responding to a source of one frequency and tuned to another frequency for establishing harmonics of both frequencies and generating beat frequencies, resonant means tuned to one of said beat frequences and having a transformer with a primary winding series connecting said idler circuit to the source, a core in said transformer closing upon itself and having a portion embraced by said primary winding, said core having a cross section substantially uniform throughout its shape, a secondary winding in said transformer embracing another portion of the core, magnetic means for diverting a portion of the flux generated by said primary winding in the core away from said secondary winding and back to said primary winding so as to increase the inductance exhibited by said primary winding, said magnetic means including spare portions on the core between said primary winding and said secondary winding and including a magnetic shunt connecting said spare portions, output leads from said resonant means, voltage control means in said magnetic means for regulating the voltage at said output leads and including gaps between said shunt and said core portions for producing flux fringing in the vicinity of said core so that some flux lines from the flux path in the shunt impinge upon the core, and capacitor means connected across one of said windings for tuning said resonant means, said voltage control means being the sole means for regulating the output voltage at said leads.

11. A frequency generator comprising, idler circuit means and resonant means responding to a source of a given fundamental frequency and tuned to two other fundamental frequencies, unlinear means common to said idler circuit means and to said resonant means for establishing harmonics and two sets of beat frequencies, the first of said sets being contributed by the energy of the source and said idler circuit means and the second of said sets being contributed by the energy of the source and said resonant means, said resonant means having a transformer with a primary winding series connecting said idler circuit to the source, a toroidal core in said transformer having a 135° portion embraced by said primary winding, said core having a substantially uniform cross section throughout its shape, a secondary winding embracing a diagonally opposite 135° portion of the core, magnetic means for diverting a portion of the flux generated by said primary winding in the core away from said secondary winding and back to said primary winding so as to increase the inductance exhibited by said primary winding, said magnetic means including open portions on the core between said primary winding and said secondary winding and including a magnetic shunt connecting said open portions, and capacitor means connected across one of said windings for tuning said resonant means, the frequency to which said resonant means are tuned being one of said beat frequencies to which said idler circuit means contribute, the frequency of said idler circuit means being a beat frequency to which said tuned circuit means contribute output leads from said resonant means, said magnetic means forming voltage controlling means for regulating the voltage appearing at said output leads relative to the voltage at said source, said voltage control means including a gap in said magnetic means for producing flux lines that induce in said core energy-reducing eddy currents, said voltage controlling means being the sole means for regulating the voltage at said output leads.

12. A frequency generator comprising, nonlinear idler circuit means responding to a source of one frequency and tuned to another frequency for establishing harmonics of both frequencies and generating beat frequencies, a resonant circuit tuned to one of said beat frequencies and having a transformer with a primary winding series connecting said idler circuit to the source, a toroidal core in said transformer having a 135° portion embraced by said primary winding, said core having a substantially uniform cross section throughout its shape, a secondary winding embracing a diagonally opposite 135° portion of the core, magnetic means for diverting a portion of the flux generated by said primary winding in the core away from said secondary winding and back to said primary winding so as to increase the inductance exhibited by said primary winding, said magnetic means including open portions on the core between said primary winding and said secondary winding and including a magnetic shunt connecting said open portions, output leads from said resonant circuit, voltage control means in said magnetic means for regulating the voltage at said output leads and including gaps between said shunt and said core portions for producing flux fringing in the vicinity of said core so that some flux lines from the fringing impinge upon the core, and capacitor means connected across one of said windings for tuning said resonant means, said voltage control means being the sole means for regulating the output voltage at said leads.

References Cited

UNITED STATES PATENTS

| | | | |
|---|---|---|---|
| 2,150,386 | 3/1939 | Manley | 321—68 |
| 2,272,246 | 2/1942 | Manley | 321—69 |
| 2,277,809 | 3/1942 | Wrathall | 321—68 |
| 2,340,376 | 2/1944 | Grandstaff | 321—68 X |
| 2,364,531 | 12/1944 | Huge | 321—68 X |
| 3,128,443 | 4/1964 | Herman et al. | 336—165 X |
| 3,235,785 | 2/1966 | Stevens | 321—69 |

JOHN F. COUCH, *Primary Examiner.*

WARREN E. RAY, *Examiner.*

G. GOLDBERG, *Assistant Examiner.*